(12) United States Patent
Guada et al.

(10) Patent No.: US 9,524,630 B2
(45) Date of Patent: Dec. 20, 2016

(54) RADON MITIGATION SYSTEM MONITORING HAVING A FLUID FLOW SWITCH WITH AN ADJUSTABLE WING

(71) Applicant: Dwyer Instruments, Inc., Michigan City, IN (US)

(72) Inventors: Alejandro Ignacio Baez Guada, Chicago, IL (US); Matthew Goldschmidt, Valparaiso, IN (US)

(73) Assignee: Dwyer Instruments, Inc., Michigan City, IN (US)

( * ) Notice: Subject to any disclaimer, the term of this patent is extended or adjusted under 35 U.S.C. 154(b) by 54 days.

(21) Appl. No.: 14/491,406

(22) Filed: Sep. 19, 2014

(65) Prior Publication Data

US 2016/0086471 A1    Mar. 24, 2016

(51) Int. Cl.
| G08B 21/00 | (2006.01) |
| G08B 21/14 | (2006.01) |
| F24F 7/10 | (2006.01) |
| F24F 11/02 | (2006.01) |
| G01F 1/28 | (2006.01) |
| G01P 13/00 | (2006.01) |
| F24F 11/00 | (2006.01) |

(52) U.S. Cl.
CPC .............. *G08B 21/14* (2013.01); *F24F 7/10* (2013.01); *F24F 11/022* (2013.01); *G01F 1/28* (2013.01); *G01P 13/002* (2013.01); *F24F 2011/0052* (2013.01)

(58) Field of Classification Search
CPC ....................................... G08B 21/14
USPC ......... 340/608, 610, 632; 454/358; 250/253, 250/370.02, 370.07
See application file for complete search history.

(56) References Cited

U.S. PATENT DOCUMENTS

| 3,188,421 | A | 6/1965 | Rowell |
| 4,282,413 | A | 8/1981 | Simons et al. |
| 4,495,388 | A | 1/1985 | Yoder |
| 5,945,608 | A | 8/1999 | Hutchinson |
| 6,196,070 | B1 | 3/2001 | Piascik et al. |
| 2012/0064616 | A1 | 3/2012 | Liu |
| 2013/0295837 | A1* | 11/2013 | Bailey ................ F24F 3/16 454/356 |

* cited by examiner

*Primary Examiner* — Jeffery Hofsass
(74) *Attorney, Agent, or Firm* — Tarolli, Sundheim, Covell & Tummino LLP (57) ABSTRACT

An apparatus for monitoring air flow in a vent pipe of a radon mitigation system includes a base connectable to the vent pipe. The base houses a circuit that is actuatable to indicate the condition of the radon mitigation system. An air flow switch actuates the circuit, the air flow switch includes a vane that is supported by the base and extends into the interior of the vent pipe through an opening in a wall of the vent pipe. The vane includes a wing having portions that are deflectable to permit installation of the wing through an opening in the vent pipe. The deflectable portions return under their own resilience to their non-deflected conditions once they pass through the opening in the vent pipe.

27 Claims, 9 Drawing Sheets

RADON MITIGATION SYSTEM MONITORING HAVING A FLUID FLOW SWITCH WITH AN ADJUSTABLE WING

TECHNICAL FIELD

The present disclosure is directed to air flow sensing. More specifically, the present disclosure is directed to a flow switch for detecting air flow in a vent pipe of a radon mitigation system.

BACKGROUND

Radon (chemical symbol Rn, atomic number 86) is a naturally occurring, radioactive noble gas that is produced by the radioactive decay of radium-226. Radon is one of the densest substances that remains a gas under normal conditions. Radon is considered a health hazard clue to its radioactivity.

Radon concentration varies widely from place to place. In the open air, it ranges from 1 to 100 becquerels per cubic meter ($Bq/m^3$), and even less (0.1 $Bq/m^3$) above the ocean. Some level of radon will be found in most homes, and typical domestic exposures are of approximately 100 $Bq/m^3$ indoors. Radon enters a home through the lowest level in the home that is in contact with open ground. Typical entry points of radon into homes are cracks in solid foundations, construction joints, cracks in walls, gaps in suspended floors, gaps around service pipes, cavities inside walls, and the water supply. Due to its heavy nature, radon gas from natural sources can accumulate to far higher than normal concentrations in buildings, especially in low areas such as basements and crawl spaces.

Studies have shown a clear link between breathing high concentrations of radon and incidence of lung cancer. Thus, radon is considered a significant contaminant that affects indoor air quality worldwide. According to the United States Environmental Protection Agency, radon is the second most frequent cause of lung cancer, causing 21,000 lung cancer deaths per year in the United States.

Because of this, radon mitigation systems are recommended in residential structures and other buildings where the measured radon in the air meets or exceeds certain concentrations. Many authorities cite 4 picocuries radon per liter of air (about 150 Bq/m3) as the concentration above which mitigation is recommended. These recommendations can, however, vary widely depending on factors such as the authority issuing the recommendation and the particulars of the environment in which radon mitigation is being considered. In fact, many homeowners choose to implement radon mitigation systems or procedures where the measured level is less than 4 picocuries radon per liter, based on their geographic location and the knowledge that levels can vary widely over time.

One common type of radon mitigation system for buildings that have a basement or a slab-on-grade foundation is a soil suction system. Soil suction systems prevent radon from entering the building by drawing radon from below the building and venting it through one or more pipes to above the building where it is quickly diluted in the atmosphere. Soil suction systems typically involve one of four types of soil suction: sub-slab suction, drain tile suction, sump hole suction, or block wall suction.

Sub-slab suction (also called sub-slab depressurization) is the most common radon reduction method. Radon mitigation systems that employ this method include one or more suction pipes inserted through the floor slab into the crushed rock or soil underneath. Alternatively, the pipe(s) can be inserted below the concrete slab from outside the building. The number and location of suction pipes that are needed depends on the strength of the radon source and on how easily air can move in the crushed rock or soil under the slab. Often, only a single suction point is needed.

A vent fan connected to the suction pipes draws the radon gas from below the home and releases it into the outdoor air while simultaneously creating a negative pressure or vacuum beneath the slab. Common fan locations include unconditioned home and garage spaces, including attics, and the exterior of the home.

The other soil suction systems are similar to the sub-slab system, with the difference lying in the means by which the sub-slab air space is accessed. Drain tile suction systems apply suction to the buildings drain tiles or perforated pipes that are used to direct water away from the building foundation. Suction on these tiles or pipes can also be effective in mitigating radon levels. In sump hole suction systems, the sump can be capped so that it can continue to drain water and serve as the location for a radon suction pipe. In basements with hollow block foundation walls, block wall suction systems can be used to remove radon and depressurize the block wall, much in a way similar sub-slab suction. In fact, this method can be used in combination with sub-slab suction. In crawl space buildings, the earth floor of the crawl space is covered with a gas impermeable sheet or membrane, and suction is applied to remove the radon from beneath the sheet.

In the soil suction radon mitigation systems described above, a vent pipe and fan are used to draw the radon from beneath the building and vent it to the outdoors. Typically, at least for residential structures, the system is designed to utilize standard 4-inch (4.5-inch O.D.) PVC pipes as the vent pipes. For example, many radon mitigation systems use standard 4-inch schedule 40 PVC pipes as the vent pipe. Some systems can use 3-inch PVC pipes. The vented gas should be released above the building so that the radon can be dispersed in the atmosphere outside the presence of people. Additionally, in order to maintain a desired level of radon removal, the fan and the system have to be designed to maintain a certain threshold of volumetric air flow through the vent pipe. Because of these considerations, the location where the sub-slab space is accessed is often chosen so that the vent pipe can run as vertically as possible to the above-structure vent location. This direct path configuration offers the least air flow resistance, which helps allow the system to operate both effectively and efficiently.

Since radon mitigation systems are designed to run continuously and perpetually, it is important to monitor whether the system is operating properly. This entails not just ensuring that the fan is operating properly, but also that the volumetric air flow through the vent pipe is maintained at an adequate level. Factors such as vent duct blockage due, for example, to leaves, to bird or insect nests, or to the accumulation over time of dust, dirt, or other debris, can reduce air flow through the vent. Additionally, impedances to air flow can also occur below the slab due, for example, to the accumulation of moisture and foundation shifting or settling. Further, the vent fan can become less efficient or can malfunction over time. Because radon mitigation systems are easily susceptible to out-of-sight, out-of-mind forgetfulness, real-time system monitoring is preferable over relying on routine maintenance checks.

For a typical radon mitigation systems, normal flow rates within the standard 4-inch vent pipe can be as high as 450 cubic feet per minute (cfm) or more. In these typical radon mitigation systems, however, the threshold rate at or above which flow in the vent pipe should be maintained can be as low as only 10 cfm. Those skilled in the art will appreciate that, given the diameter (4") of the vent pipe, 10 cfm is a relatively low flow rate. Thus, an effective system monitor needs to accommodate these normal (e.g., 450 cfm) flow rates while simultaneously possessing the sensitivity/resolution to detect whether the flow rate falls below the 10 cfm threshold.

SUMMARY

The invention is directed to air flow sensing and, in particular, a flow switch for detecting air flow in a vent pipe of a radon mitigation system.

According to one aspect, an apparatus for monitoring air flow in a vent pipe of a radon mitigation system includes a base connectable to the vent pipe. The base houses a circuit that is actuatable to indicate the condition of the radon mitigation system. The apparatus also includes an air flow switch for actuating the circuit. The air flow switch includes a vane that is supported by the base and extends into the interior of the vent pipe through an opening in a wall of the vent pipe. The vane includes a wing that has portions that are deflectable to permit installation of the wing through an opening in the vent pipe. The deflectable portions returning under their own resilience to their non-deflected conditions once they pass through the opening in the vent pipe. The apparatus according to this aspect can include any of the following features individually or in any combination:

The deflectable portions of the wing can include lateral extensions that are deflectable to permit insertion of the wing portion through the opening in the vent pipe. The lateral extensions can return to their non-deflected conditions under their own resilience.

The wing can have a length measured along a longitudinal axis of the wing, and a width measured transverse to the length. The wing can be configured to be installed lengthwise through the opening in the vent pipe. Deflection of the wing for installation reduces the overall width of the wing. The width of the wing is at least twice the diameter of the opening in the vent pipe.

The wing can include corrugations that extend lengthwise along the length of the wing. The corrugations can be arranged adjacent to each other across the width of the wing. The corrugations can permit the deflectable portions to deflect along the corrugations about bend lines that extend parallel to the length of the corrugations.

The circuit can include a magnetic sensor for actuating the circuit. The vane can include a magnet that is movable relative to the magnetic sensor when the vane pivots in response to air flow in the vent pipe. The magnetic sensor can be a reed switch or a Hall effect sensor.

The vane can pivot relative to the base about a pivot axis. The base can be installed on the vent pipe so that the vane pivots along a generally vertical plane, so that gravity acting on the vane urges it to pivot toward an actuated condition of the air flow switch. Air flow in the vent pipe acting on the wing urges the vane to pivot toward a non-actuated condition of the air flow switch.

The vane can include a magnet side and a wing side positioned on opposite sides of a pivot axis so as to counterbalance each other. The moment of force due to gravity on the wing side of the vane can be greater than the moment of force due to gravity on the magnet side so that gravity urges the vane to pivot toward the actuated condition. The counterbalance can be selected so that air flow of a predetermined magnitude overcomes this counterbalance and causes the vane to pivot toward the non-actuated condition. The air flow switch can be configured so that the vane pivots in a vertically extending plane, against the force of gravity, in response to the air flow. According to this aspect, the predetermined air flow magnitude can be 10 cfm. Additionally, according to this aspect, the vent pipe can be a standard vent pipe having an inside diameter of about 4-inches, and the predetermined air flow magnitude can be about 10 cfm.

The vane can include a pivot piece to which the wing is connected. The pivot piece can be connectable to the base and pivotable with respect to the base to allow the vane to pivot in response to air flow in the vent pipe acting on the wing. The pivot piece can include a magnet mount and a wing mount positioned on opposite sides of the pivot axis. The vane can be configured so the moment of force due to gravity on the wing side of the vane is greater than the moment of force due to gravity on the magnet side of the vane which causes the vane to pivot toward the actuated condition. The counterbalance can be selected so that air flow of a predetermined magnitude acting on the wing overcomes this counterbalance and causes the vane to pivot toward the non-actuated condition. The air flow switch can be configured so that the vane pivots in a vertically extending plane, against the force of gravity, in response to the air flow. The vent pipe can be a standard vent pipe having an inside diameter of about 4-inches, and the predetermined air flow magnitude can be about 10 cfm.

The deflection of the wing can permit the wing to have a width that is larger than the diameter of the opening in the vent pipe by a factor of two or more.

The wing can be shaped and dimensioned to actuate the switch in response to a predetermined volumetric air flow rate in a first vent pipe having a first cross-sectional area. The wing can include wing material removal features for facilitating the removal of wing material to re-configure the wing to be responsive to the predetermined volumetric air flow rate in a second vent pipe having a second, smaller cross-sectional area. The first vent pipe can be a 4-inch vent pipe, and the second vent pipe can be a 3-inch vent pipe. The predetermined volumetric air flow rate can be about 10 cfm. The wing material removal features can include deformations of the wing material and/or indicia on the wing material.

According to another aspect, an apparatus for monitoring air flow in a vent pipe of a radon mitigation system includes a base connectable to the vent pipe. The base can house a circuit that is actuatable to indicate the condition of the radon mitigation system, and an air flow switch for actuating the circuit. The air flow switch can include a vane including a wing for being positioned in the vent pipe. The wing can be shaped and dimensioned to actuate the switch in response to a predetermined volumetric air flow rate in the vent pipe, where the vent pipe has a first cross-sectional area. The wing can include wing material removal features for facilitating the removal of wing material to re-configure the wing to be responsive to the predetermined volumetric air flow rate, where the vent pipe has a second, smaller cross-sectional area. The apparatus according to this aspect can include any of the following features individually or in any combination:

The vent pipe having the first cross-sectional area can be a 4-inch vent pipe, and the vent pipe having the second cross-sectional area can be a 3-inch vent pipe. The predetermined volumetric air flow rate can be about 10 cfm.

The wing material removal features can include deformations of the wing material and/or indicia on the wing material.

BRIEF DESCRIPTION OF THE DRAWINGS

The present invention is illustrated by way of example and not limitation in the figures of the accompanying drawings, in which like references indicate similar elements and in which.

DESCRIPTION

Figure 1:
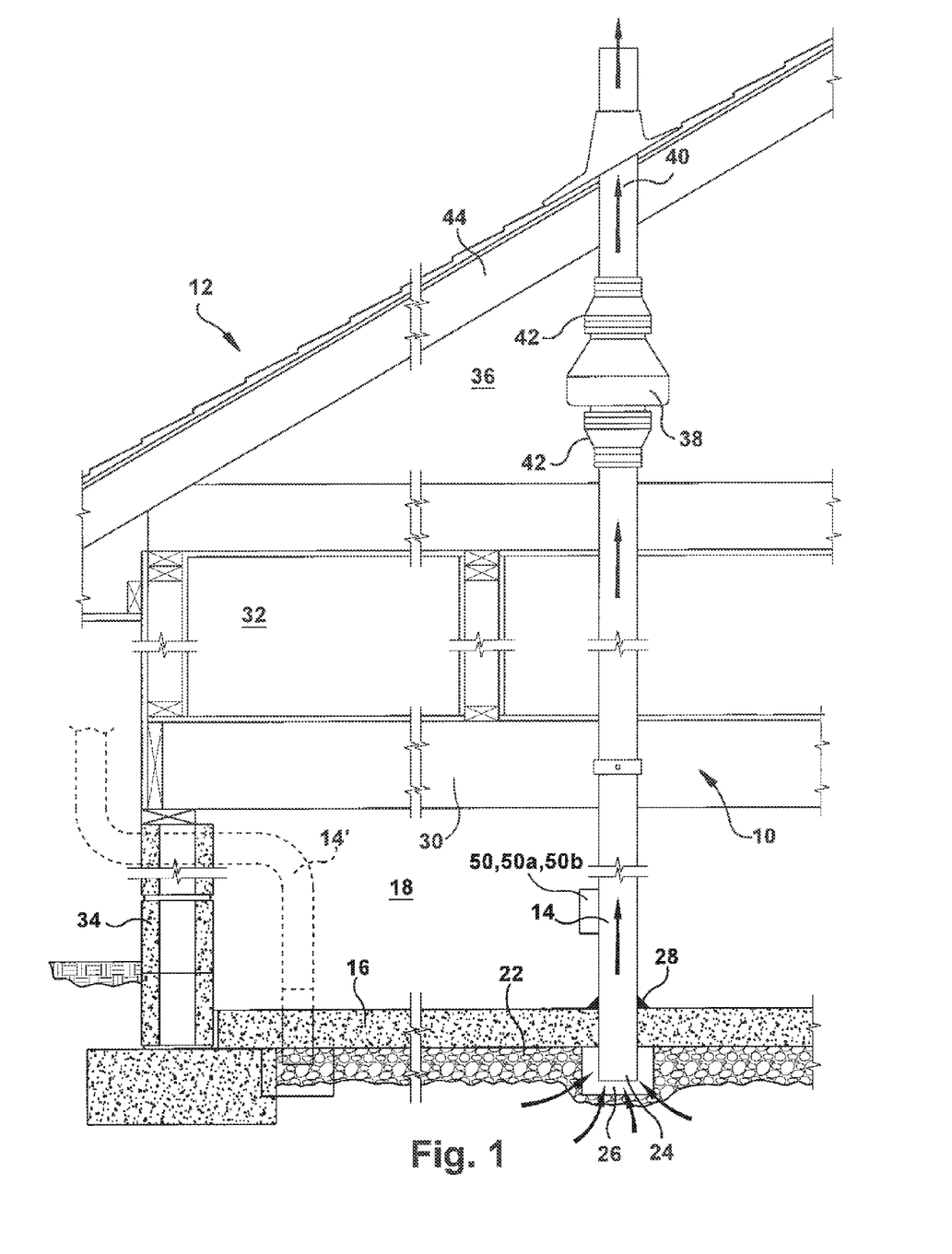
FIG. 1 is a schematic illustration depicting a building implementing a radon mitigation system.

The present invention relates to mitigation systems for removing radon from a building, such as a residential home. FIG. 1 illustrates by way of example a radon mitigation system 10 for removing radon from a building 12. In the example illustrated in FIG. 1, the system 10 is a sub-slab soil suction system installed in the basement 18 of the building 12. The radon mitigation system 10 could be of an alternative type, such as drain tile suction, sump hole suction, or block wall suction.

The radon mitigation system 10 includes a vent pipe 14 that extends through the slab 16 in the basement 18 of the building 12. Typically, the vent pipe 14 is a conventional (e.g., schedule 40) 4-inch PVC pipe. Although vent pipes with other diameters can be used, 4-inch PVC pipe is by far the most common. The vent pipe 14 extends through the slab 16 and has an open end 24 exposed to the crushed rock and soil 22 beneath the slab 16. As shown in FIG. 1, some of the crushed rock/soil 22 may be removed in order to create a sub-slab space 26 in which the open end or inlet 24 of the vent pipe 14 is exposed. A sealant 28, such as a silicone caulk, seals the space between the outside of the vent pipe 14 and the slab 16.

The vent pipe 14 extends upward from the slab 16 through the floor(s) 30 and living space 32 of the building 12 as needed and preferably in a hidden or non-conspicuous manner. For installations in existing structures, the vent pipe 14 can be routed outside the building 12 and up an exterior wall 34 (see, e.g., the vent pipe illustrated generally in dashed lines at 14' in FIG. 1). The vent pipe 14 extends from the basement 18 up into the attic 36, where it is connected with a fan 38. The fan 38 could be located at any location along the length of the vent pipe 14, although the basement 18 or attic 36 may be preferred due to space/access and noise considerations. The fan 38 has an inlet connected to the vent pipe 14 and an outlet connected to an exhaust pipe 40 via respective couplings 42. The exhaust pipe 40 extends through the building roof 44.

In operation, the fan 38 draws in air (and any radon present in the air) from the sub-slab space 26 through the vent pipe inlet 24, moves the air though the vent pipe 14 and fan 38, and discharges the air into the atmosphere above the roof 44 via the exhaust pipe 40, as indicated generally by arrows in FIG. 1. In order to help ensure that the system 10 provides continuous, around-the-clock (24/7) radon mitigation, the system can include a system monitor 50. The system monitor 50 can, for example, include a flow switch that is configured to monitor whether the volumetric flow within the vent pipe 14 is maintained at or above a threshold magnitude indicative of sufficient sub-slab air, and therefore radon, removal. If flow in the vent pipe 14 falls below this threshold level, the system monitor 50 provides indication, e.g., audible, visual, etc., that the radon mitigation system 10 needs attention.

For a typical, conventional radon mitigation system 10, normal flow rates within the standard 4-inch vent pipe 14 can be as high as 450 cubic feet per minute (cfm) or more. In these conventional radon mitigation systems, however, the threshold rate at or above which flow in the vent pipe should be maintained can be as low as only 10 cfm. Those skilled in the art will appreciate that, given the diameter (4") of the vent pipe 14, a flow rate of 10 cfm is relatively low. Thus, the system monitor 50 has to accommodate the normal (e.g., 450 cfm) flow rates while simultaneously possessing the sensitivity/resolution to detect whether the flow rate drops below 10 cfm.

Figure 2:
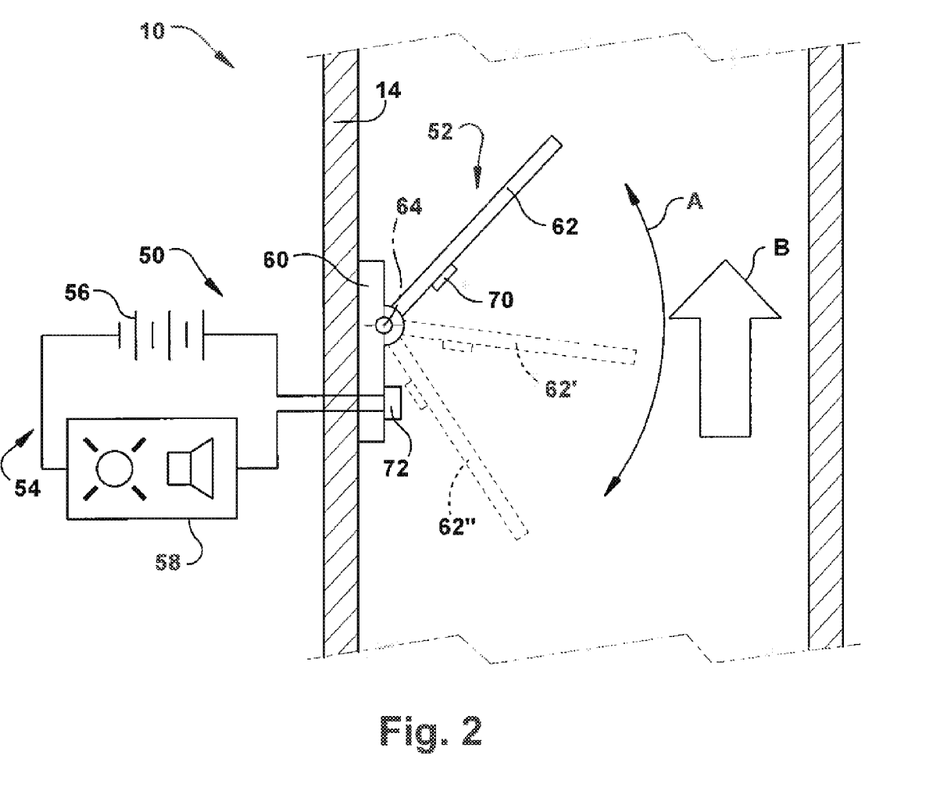
FIG. 2 is a schematic illustration depicting the operation of a radon mitigation system monitor.

FIG. 2 illustrates schematically a system monitor 50 for monitoring the operation of the radon mitigation system 10. The system monitor 50 is illustrative of the general principles of operation of the various embodiments disclosed herein. The system monitor 50 includes a flow switch 52 that is actuatable to open/close a circuit 54 that includes a power source 56 (wired, battery powered, or wired with a battery back-up) for powering an alarm 58, which can include audible alarms, visual alarms, or both.

The flow switch 52 includes a base 60 that is secured to the vent pipe 14. The base 60 supports a vane 62 for pivotal movement (indicated generally by curved arrow A in FIG. 2) about an axis 64. It is through this pivotal movement that the vane 62 actuates the flow switch 52. The flow switch 52 is located in a vertically extending portion of the vent pipe 14 and positioned so that gravity acting on the vane 62 urges the vane to pivot downward as viewed in FIG. 2. Air flow, indicated generally by arrow B in FIG. 2, urges the vane 62 to pivot upward as viewed in FIG. 2.

The actuatable portion of the switch 52 can have various configurations capable of opening/closing the circuit 54. The switch 52 can include a base mounted switch component 64 and a vane mounted switch component 70 configured to open/close the circuit 54 in response to pivotal movement of the vane 62. For example, the switch 52 can be a mechanical switch in which the switch components 64 and 70 are contacts that physically engage/disengage with each other to open/close the circuit 54.

As another example, the switch 52 can be a magnetic switch in which one of the switch components 64 and 70 is a permanent magnet and the other of the switch components is a sensor responsive to the presence or magnitude of magnetic fields to which it is exposed. In this example, the vane mounted switch component 70 is best suited to be the permanent magnet component due to the fact that this component requires no wiring. A variety of magnetic sensors can be implemented as the base mounted switch component 64. For example, the base mounted switch component 64 can be a magnetic reed switch, which typically includes normally open ferrous metal contacts configured to close in the presence of a magnetic field and open when that field is removed. As another example, the base mounted switch component 64 can be a Hall effect sensor, which is a transducer that varies its output voltage in response to the magnitude of a magnetic field and, thus, can be implemented as a magnetic switch. In this description, the base mounted switch component 64 is described as a magnetic switch, which is intended to encompass a reed switch, a Hall effect sensor, or any other electrical switch that is actuatable in response to the presence of a magnetic field of a predetermined magnitude.

In the configuration of FIG. 2, the flow switch 52 includes a permanent magnet 70 mounted on the vane 62 and a magnetic sensor 64 mounted on the base 60. In operation, air flow B in the vent pipe 14 causes the vane to pivot upward against gravity. In an upward position of the vane illustrated in solid lines at 62 in FIG. 2, the magnet 70 is positioned away from the magnetic sensor 64. As air flow B is reduced, the vane 62 begins to pivot downward, as shown generally at 62'. Still, in this intermediate position of the vane 62', the magnet 70 is positioned such that the magnitude of the magnetic flux acting on the magnetic sensor 64 is not sufficient to actuate the sensor. When the air flow B in the vent pipe 14 is reduced to a threshold level, the vane 62 reaches a corresponding pivotal position, indicated generally at 62". At this position of the vane 62", the magnet 70 is positioned so that the magnitude of the magnetic flux acting on the magnetic sensor 64 is sufficient to actuate the sensor. The circuit 54 is configured so that actuation of the magnetic sensor 64 activates the alarm 58, indicating the low air flow condition of the radon mitigation system 10.

Since the air flow switch 52 operates fundamentally on the basis of air flow versus gravity, the trip point of the switch, i.e., the air flow above which the switch is open and below which the switch closes, can be configured through careful design, taking into consideration factors such as the shape, weight, surface area, and orientation of the vane 62 and the air flow rates inside the vent pipe 14. If flow around the vane 62 was laminar, the calculations and configurations would be fairly straightforward. Flow around the vane 62, however, is turbulent, which increases the complexity of the design.

Turbulent flow around the vane 62 causes the formation of vortices that shed along the trailing edge(s) of the vane. As a known phenomena, these vortices form along and shed from the vane 62 in series that alternate, which creates alternating pressures along the vane. These alternating pressures can cause the vane 62 to oscillate, even though air flow in the vent pipe 14 is constant. If the air flow in the vent pipe 14 is well above the threshold, vane oscillation is not a problem. If, however, air flow in the vent pipe 14 is near or approaching the threshold for triggering the alarm 58, this oscillation can cause false alarming. Accordingly, the design of the system monitor 50 should take into account vane oscillation due to vortex shedding. This can be done through the design of the circuit 54, the design of the vane 62 or through the design of the circuit and vane in combination.

FIGS. 3-6 illustrate a radon mitigation system monitor 50a according to one embodiment of the invention. The system monitor 50a of FIGS. 3-6 is similar in configuration and function to the system monitor 50 described above and illustrated in FIG. 2. Therefore, in this description of the system monitor 50a, reference numbers identical to those used in FIG. 2 will be utilized, with the suffix "a" added for clarity. The system monitor 50a is configured and operates substantially identically to the system monitor 50 of FIG. 2, with the exception of the configuration of the air flow switch, particularly, the switch vane.

Figure 6:
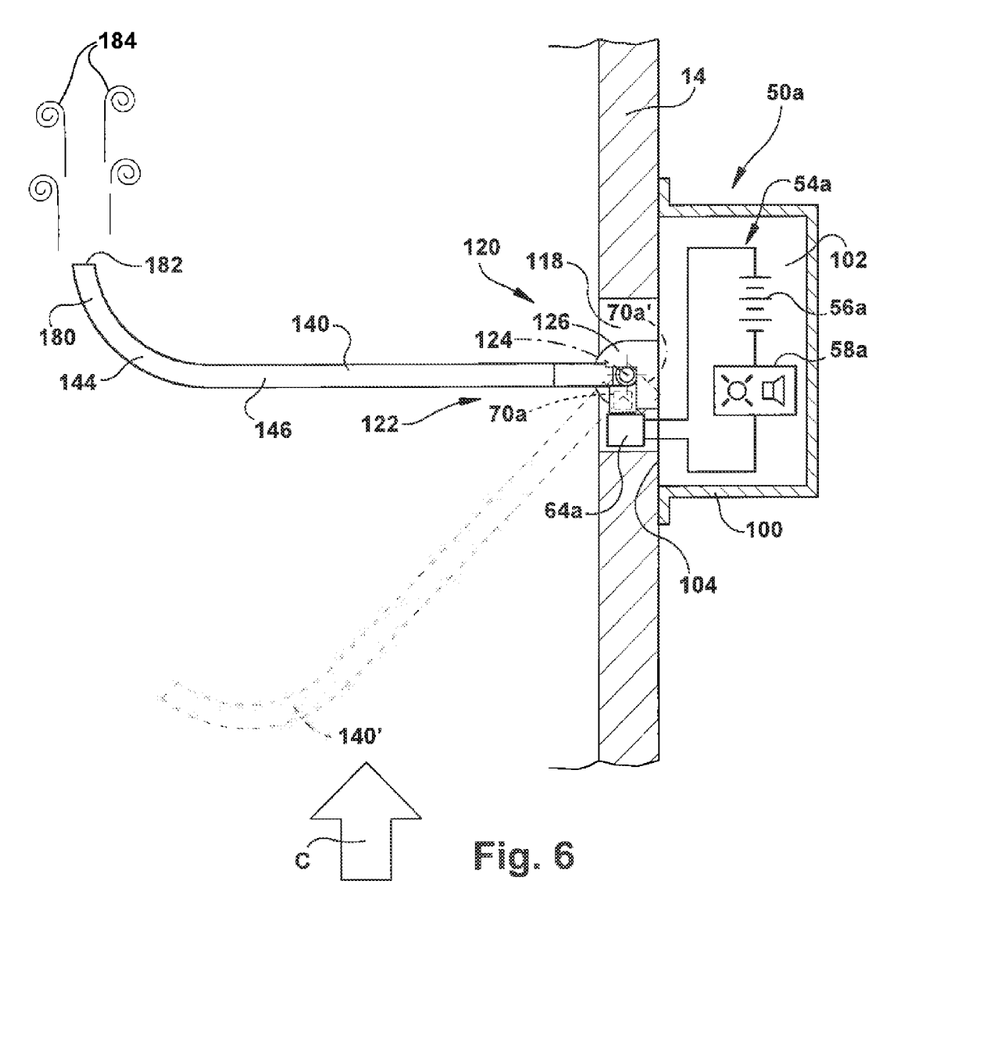
Figure 7:
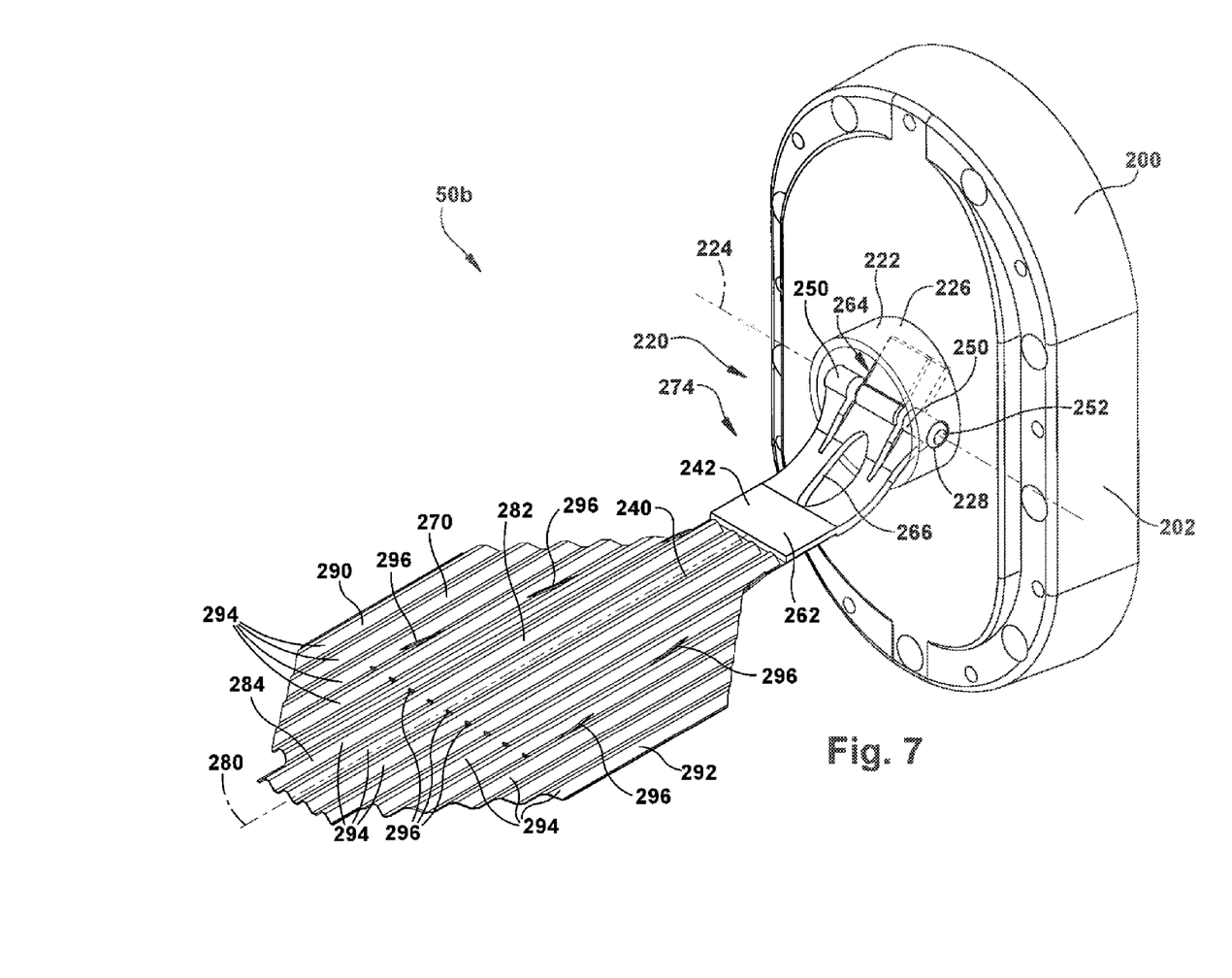
FIGS. 7-13 illustrate a configuration of a radon mitigation system monitor according to a second embodiment.

Referring to FIG. 6, the system monitor 50a includes a base 100 that supports a vane 140. The base 100 includes a housing 102 that supports, encloses, and protects the circuitry 54a, including the power source 56a and the alarm 58a. The base 100 also supports an air flow switch 120. The air flow switch 120 includes a magnet 70a that is supported on the vane 140 and movable with the vane toward and away from the circuitry 54a in the housing 102. The air flow switch 120 also includes a magnetic sensor 64a that forms a portion of the circuitry 54a. The magnetic sensor 64a is actuatable in response to the magnitude of the magnetic field of the magnet 70a to which it is exposed. The magnetic sensor 64a, when actuated, causes the alarm 58a to sound.

The flow switch 120 includes a vane mount 122 for supporting the vane 140 for pivotal movement about an axis 124. The vane mount 122 includes a pair of laterally spaced hinge ears 126 that have respective openings 128 aligned with each other along the axis 124. The hinge ears 126 project from a rear surface 104 of the base 100.

Figure 3:
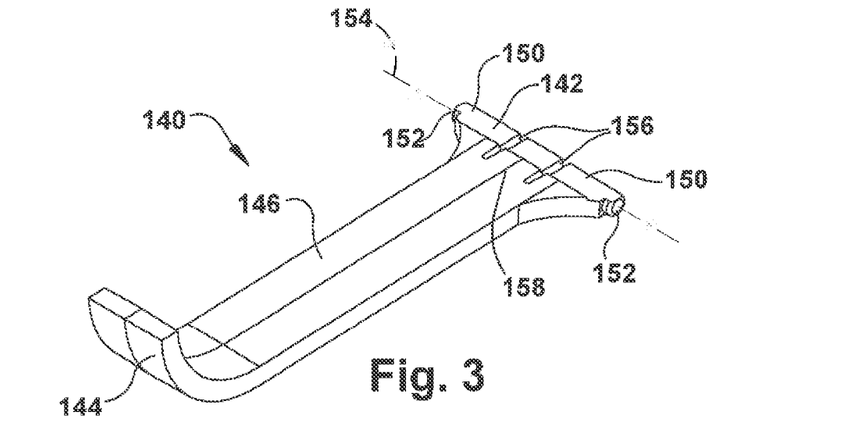
FIGS. 3-6 illustrate a configuration of a radon mitigation system monitor according to a first embodiment.
Figure 4:
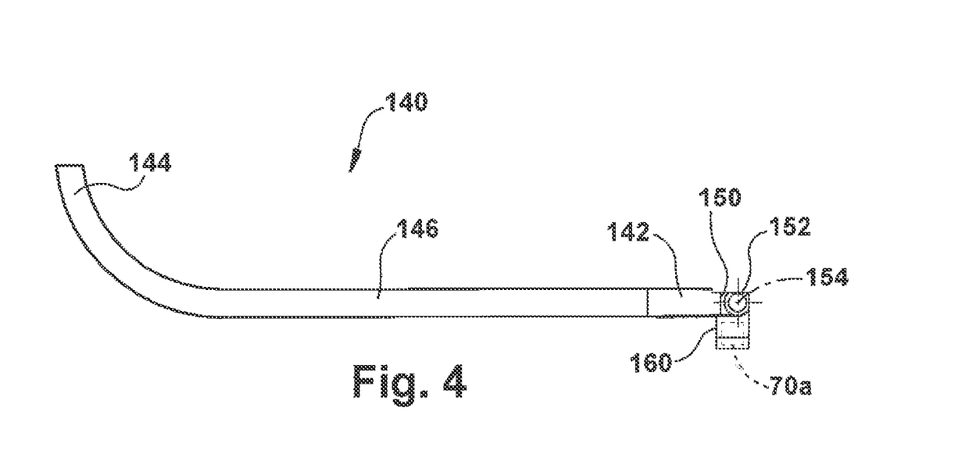
Figure 5:
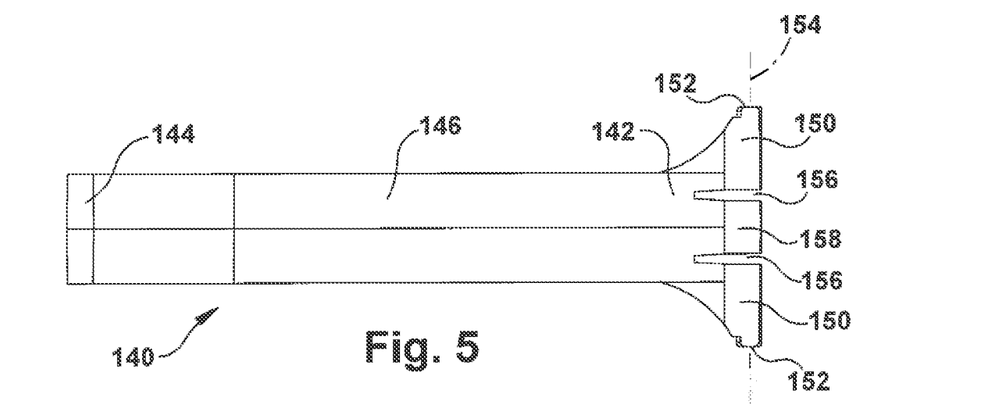

Referring to FIGS. 3-5, the vane 140 has a generally elongated rectangular configuration, including a first end portion 142 and an opposite upturned second end portion 144. A wing portion 146 of the switch vane 100 extends linearly between the first and second end portions 102, 104. The first end portion 102 includes hinge knuckles 150, each of which has a cylindrical hinge pin portion 152 that protrudes laterally outward on opposite sides of the vane 140. The first end portion 142 of the vane 140 includes a pair of notches 156 that help define the knuckles 150 from a central portion 158 of the first end. The knuckles 150 and hinge pins 152 are aligned with each other along a pivot axis 154 of the vane 140.

The hinge knuckles 150 of the vane 140 are configured to cooperate with the hinge ears 126 of the vane mount 122. The hinge pins 152 of the knuckles 150 are configured for insertion into corresponding openings in the hinge ears 126 to connect the vane 140 to the base 100. The notches 156 in the first end portion 142 allow the hinge knuckles 150 to deflect inward to facilitate inserting the knuckles between the hinge ears 126. Once inserted, the pins 152 on the knuckles 150 snap into the openings. The openings and the pins 152 are sized so that the pins can rotate while supported by the hinge ears 126, thus permitting the vane 140 to pivot relative to the base.

The central portion 158 of the first end 142 of the vane 140 includes a magnet mount 160 that receives and supports the magnet 70a component of the air flow switch 120. The vane 140 is configured so that the magnet mount 160 and the magnet 70a are positioned to activate the magnetic sensor 64a when the vane is in an actuated condition/position and to de-activate the magnetic sensor when the vane is in a non-actuated condition/position. The magnet mount 160 can also be configured and positioned relative to the pivot axis 154 so that the magnet 162 and the mount act as a counterbalance to the portion of the vane 140 on the opposing side of the hinge formed by the ears 126 and knuckle 150.

Referring to FIG. 6, the base 100 is configured to be connected to an exterior surface of the vent pipe 14 to thereby mount the system monitor 50a to the pipe. Prior to mounting the base 100 to the vent pipe 14, an opening 118 is be drilled, bored, or otherwise formed in the wall of the pipe. When the base 100 is mounted to the vent pipe 14, the vane mount 122 is positioned in the opening 118 and is exposed or projects into the interior of the pipe. The vane 140, supported by the mount 122, is thus positioned in the interior of the vent pipe 14 and is free to pivot about the axis 124.

Advantageously, the base 100 is configured so that the system monitor 50a can be mounted to the vent pipe 14 from the outside of the pipe. This allows the system monitor 50a to be installed after the vent pipe 14 is in place, i.e., after the radon mitigation system 10 is installed in the building 12. This can be especially helpful in the event that the system monitor 50a is installed after the fact, either as a new, add-on component or as a replacement for an existing system monitor that is defective or malfunctioning. Since the vent pipe 14 can be of a standard size, e.g., 4-inch schedule 40 PVC pipe, the rear surface 104 of the base 100 that engages the vent pipe can be contoured to match the cylindrical surfaces of the pipe, thereby improving the fit.

In operation, the system monitor 50a monitors air flow in the vent pipe 14 and alarms when air flow in the pipe falls below a predetermined threshold, such as 10 cfm, in a manner substantially identical to that described above in reference to the system of FIG. 2. The system monitor 50a is configured to be installed in a vertically extending portion of the vent pipe 14 and positioned so that the vane pivots about the axis 124 in a generally vertical plane. Gravity acting on the vane 140 urges the vane to pivot downward as viewed in FIG. 6. Air flow, indicated generally by arrow C in FIG. 6, urges the vane 140 to pivot upward as viewed in FIG. 6.

In operation, air flow C in the vent pipe 14 causes the vane 140 to pivot upward against gravity. In an upward position of the vane 140 illustrated in solid lines in FIG. 6, the magnet 70a is positioned away from the magnetic sensor 64a. As air flow C is reduced, the vane 140 begins to pivot downward. Still, in these intermediate positions of the vane 140, the magnet 70a is positioned such that the magnitude of the magnetic flux acting on the magnetic sensor 64a is not sufficient to actuate the sensor. When the air flow C in the vent pipe 14 is reduced to a threshold level, the vane 140 reaches a corresponding pivotal position, shown in dashed lines and indicated generally at 140'. At this position of the vane 140', the magnet 70a' is positioned so that the magnitude of the magnetic flux acting on the magnetic sensor 64a is sufficient to actuate the sensor. The circuit 54a is configured so that actuation of the magnetic sensor 64a activates the alarm 58a, indicating the low air flow condition of the radon mitigation system 10.

According to the invention, the upturned second end portion 144 of the vane 140 is configured to act as a vortex shedding extension 180 that improves the performance of the radon mitigation system monitor 50a. The vortex shedding extension 180 positions the terminal end or tip 182 of the vane 140 with respect to the wing portion 146 so that the vortices (indicated generally at 184 in FIG. 6) formed at the tip 182 occur at a location that has a lesser impact on the performance of the vane. Since the tip 182 is positioned above (as viewed in FIG. 6) the wing portion 146, the fluctuating/oscillating pressures that accompany the vortices formed at the tip occur at a location relative to the wing portion 146 where their effect on the position of the vane 140 is substantially lessened. Accordingly, the vortex shedding extension 180 damps the oscillating effects of the momentum created at the tip 182 of the vane 140 by translating the location where the vortices 184 are shed to the tip of the extension.

FIGS. 7-13 illustrate a radon mitigation system monitor 50b according to another embodiment of the invention. The system monitor 50b of FIGS. 7-13 is similar in configuration and function to the system monitor 50 described above and illustrated in FIG. 2. Therefore, in this description of the system monitor 50a, reference numbers identical to those used in FIG. 2 will be utilized, with the suffix "b" added for clarity. The system monitor 50b is configured and operates substantially identically to the system monitor 50 of FIG. 2, with the exception of the configuration of the air flow switch, particularly, the switch vane.

In the embodiment of FIGS. 7-13, the system monitor 50b includes a base 200 that supports a vane 240. The base 200 includes a housing 202 that supports, encloses, and protects the circuitry 54b, including the power source 56b and the alarm 58b. The base 200 also supports an air flow switch 220. The air flow switch 220 includes a magnet 70b that is supported on the vane 240 and movable with the vane toward and away from the circuitry 54b in the housing 202. The air flow switch 220 also includes a magnetic sensor 64b that forms a portion of the circuitry 54b. The magnetic sensor 64b is actuatable in response to the magnitude of the magnetic field of the magnet 70b to which it is exposed. The magnetic sensor 64b, when actuated, causes the alarm 58b to sound. The overall configuration or form of the base 200 is not critical, as long as it facilitates the connection with the vent pipe 14 and operation of the system monitor 50b as described herein.

The flow switch 220 includes a vane mount 222 for supporting the vane 240 for pivotal movement about an axis 224. The vane mount 222 is a portion of the base 200 that has a generally cylindrical side wall 226 that includes a pair of diametrically opposed openings 228 aligned with each other along the axis 224. The side wall 226 of the vane mount 222 projects from a rear surface 204 of the base 200. Within the space defined by the side wall 226, the vane mount 222 includes an angled bottom wall 230.

The vane 240 includes a pivot piece 242 and a wing 270. In the embodiment illustrated in FIGS. 7-13, the pivot piece 242 and the wing 270 are separate components, with the wing being connected to the pivot piece by means, such as an adhesive or fastener. This two-piece construction allows the pivot piece 242 and the wing 270 to be constructed from different materials. The pivot piece 242 and wing 270 therefore can have physical and mechanical properties that are conducive to their respective functions and to the overall function of the vane 240 described herein. For example, in one construction, the pivot piece can be constructed of a strong metal, e.g., stainless steel, and the wing 270 can be constructed of a lightweight, flexible, resilient material, such as a plastic/polymer sheet. It is also possible, however, to construct the vane 240 from a single piece of material, such as a molded plastic.

The pivot piece 242 includes hinge knuckles 250, each of which has a cylindrical hinge pin portion 252 that protrudes laterally outward on opposite sides of the pivot piece 242. A pair of notches 256 help define the knuckles 250 and a central portion 258 of the pivot piece 242. The knuckles 250 and hinge pins 252 are aligned with each other along the axis 224 of the pivot piece 242 and of the vane 240.

The hinge knuckles 250 are configured to cooperate with the vane mount 222 to connect the vane 240 to the base 200. The hinge pins 252 are configured for insertion into the openings 228 in the side wall 226. The notches 256 in the first end portion 242 can allow the hinge knuckles 250 to deflect inward to facilitate inserting the knuckles between the hinge ears 226. The side wall 226 can also deflect outward to facilitate this insertion. Once inserted, the pins 252 on the knuckles 250 snap into the openings 228 and the connection is made. The openings 228 and the pins 252 are sized so that the pins can rotate within the openings, thus permitting the vane 240 to pivot freely relative to the vane mount 222 and the base 200.

The central portion 258 of the pivot piece 242 includes a magnet mount 260 that receives and supports the magnet 70b component of the air flow switch 220. The pivot piece 242 also includes a wing mount 262 to which the wing 270 is connected in an assembled condition of the vane 240. The magnet mount 260 and wing mount 262 are positioned on opposite sides of the pivot axis 224. In this configuration, when the vane 240 is mounted to the base 200, the magnet side 262 of the vane, i.e., the magnet mount 260 and the magnet 70b, acts as a counterbalance to wing side 274 of the vane, i.e., the wing mount 262 and the wing 270, and vice versa. In this configuration, with the vane 240 mounted to pivot relative to the base 200, the moment of force (or "moment") of the wing side 274 counterbalances or acts in opposition to the moment of the magnet side 262.

According to the invention, the desired balance, or more likely imbalance, between the wing side 274 and magnet side 264 moments of force can be tailored through the configuration of their respective components. This can be done by increasing/decreasing their respective masses and/or adjusting the locations of their respective centers of mass. For example, to adjust the wing side 274 moment of force, the dimensions (e.g., shape, length, width, thickness, etc.) and material construction (e.g., steel, aluminum, plastic, etc.) of the wing mount 262 can be adjusted/selected in order to increase/decrease the mass of the wing side or adjust the location of the center of mass of the wing side. For instance, the pivot piece 242 can include an opening 266 where material is removed in order to decrease the wing side 264 mass and also adjust the location of the wing side the center of mass. Similarly, the dimensions and material construction of the wing 270 can be adjusted/selected in order to increase or decrease the wing side 274 mass and/or to adjust the location of the center of mass of the wing side of the vane 240.

To adjust the magnet side 264 moment of force, the dimensions (e.g., shape, length, width, thickness, etc.) and material construction (e.g., steel, aluminum, plastic, etc.) of the magnet mount 260 can be adjusted/selected in order to increase/decrease the mass of the magnet side or the location of the center of mass of the magnet side. For instance, the length of the pivot piece 242 on the magnet side 264 could be extended to move the magnet mount 260 further away from the axis 224. This would increase the magnet side 264 mass through the addition of material to the pivot piece 242 and through the adjustment of the location of the magnet side center of mass through the addition of material and the re-configuration, i.e., extension, of the pivot piece.

Through the careful configuration of the wing side 274 and magnet side 264 components, the magnitude of the air flow forces acting on the wing 270 that are necessary to cause the vane 240 to pivot and actuate the air flow switch 220 can be tailored. To configure the air flow switch 220 to respond to a comparatively low air flow magnitude, the components of the vane 240 can be configured so that the wing side 274 and magnet side 264 moments of force are only slightly imbalanced (with the wing side being slightly heavier). To configure the air flow switch 220 to respond to a comparatively high air flow magnitude, the components of the vane 240 can be configured so that the wing side 274 and magnet side 264 moments of force have a greater imbalance (with the wing side increasingly heavier). In this manner, the sensitivity of the air flow switch 220 can be tailored so that the system monitor 50b can be configured to indicate when flow in the vent pipe 14 reaches a threshold low level, such as 10 cfm.

The wing 270 is constructed as a corrugated sheet from a material that possesses physical and material properties that allow the wing to be lightweight, strong, flexible, and resilient so that the wing, when deflected, will return to its original configuration. The wing 270 can, for example, be constructed of a plastic or polymer material, such as a high density polyethylene (HDPE) material, a low density polyethylene (LDPE) material, a polyethylene terephthalate (PET) material, a polyvinyl chloride (PVC) material, a polypropylene (PP) material, or a polystyrene (PS) material. This list of materials, however, is not exhaustive. The wing 270 can be constructed of other materials that possess the appropriate physical and material properties. An example of a non-plastic/polymer material that could potentially be used to construct the wing 270 would be aluminum or tin.

The wing 270 has a generally hexagonal configuration that is slightly elongated along a central axis 280 of the wing. A rectangular center portion 282 of the wing 270 extends the length of the wing along the axis 280. The center portion 282 includes a first end in the form of a tab 284 for connecting the wing 270 to the wing mount 262 of the pivot piece 242. The center portion 282 includes a second end in the form of a tab 286 that forms the free distal end of the wing. Trapezoidal wing extensions 290, 292 extend in opposite directions from the center portion 282 away from the axis 280.

The corrugated configuration of the wing 270 improves its functionality by both strengthening the wing and by permitting deflection of the wing in certain directions. Corrugations 294 of the wing 270 extend longitudinally, parallel to the axis 280, along the length of the wing. The corrugations 294 are positioned adjacent to each other across the width of the wing 270. In the embodiment illustrated in FIGS. 7-13, the corrugations 294 extend across the entire width of the wing 270. The corrugations 294 improve the structural integrity of the wing 270, strengthening the wing and increasing its longitudinal stiffness (i.e., its resistance to bending along lines transverse to the corrugations).

Figure 11:
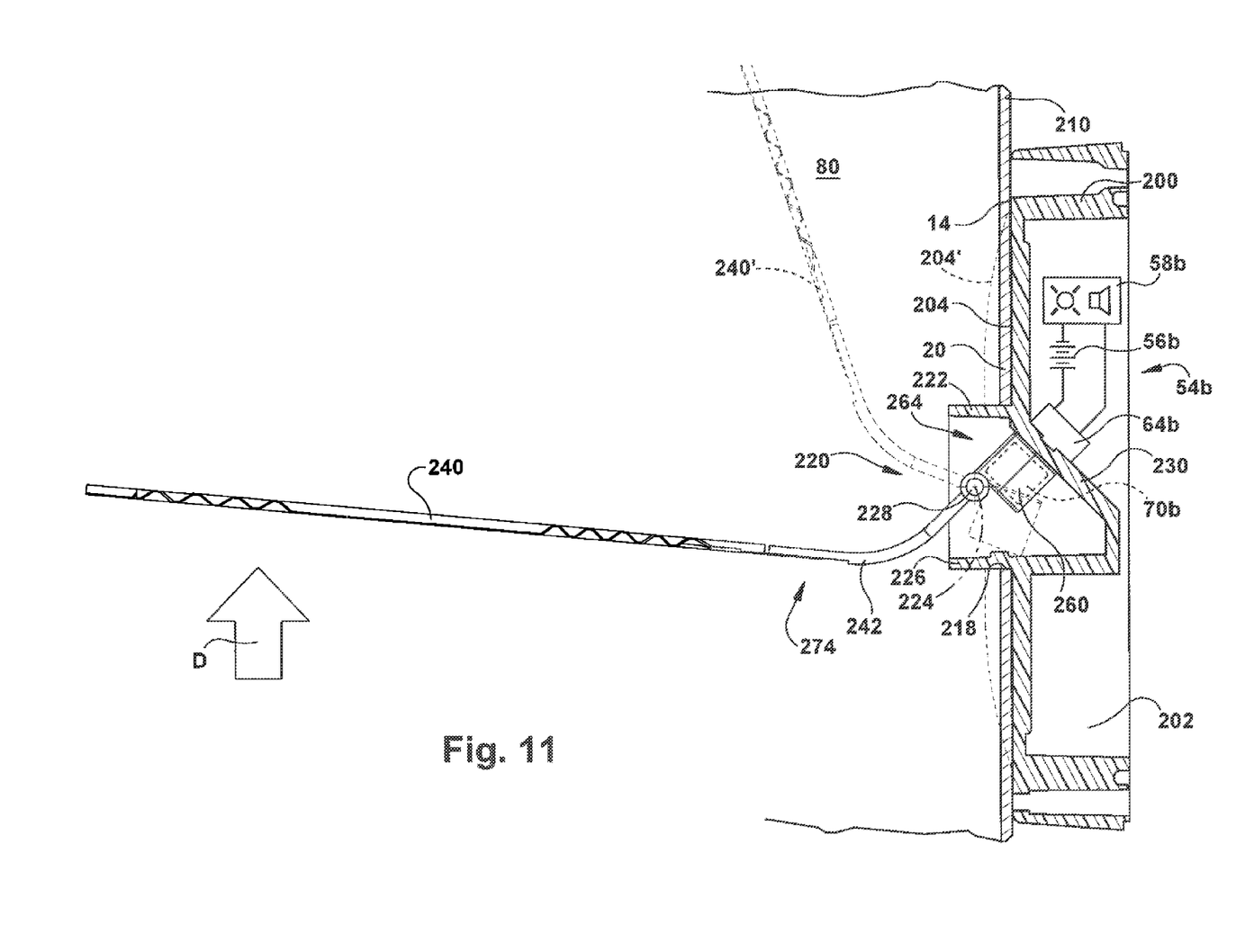

The vane 240 is configured so that the magnet mount 260 and the magnet 70b are positioned to activate the magnetic sensor 64b when the vane is in an actuated condition/position and to de-activate the magnetic sensor when the vane is in a non-actuated condition/position. Referring to FIG. 11, the base 200 is configured to be connected to an exterior surface 210 of the vent pipe 14 to thereby mount the system monitor 50b to the pipe. As indicated generally by the dashed line at 204' in FIG. 11, the rear surface 204 of the base 200 can be contoured to match the outer surface of the vent pipe 14. Prior to mounting the base 200 to the vent pipe 14, an opening 218 is be drilled, bored, or otherwise formed in the wall 20 of the pipe. When the base 200 is mounted to the vent pipe 14, the vane mount 222 is positioned in the opening 218 and is exposed or projects into the interior 80 of the pipe. The vane 240, supported by the mount 222, is thus positioned in the interior 80 of the vent pipe 14 and is free to pivot about the axis 224.

Advantageously, the base 200 is configured so that the system monitor 50b can be mounted to the vent pipe 14 from the outside of the pipe. This allows the system monitor 50b to be installed after the vent pipe 14 is in place, i.e., after the radon mitigation system 10 is installed in the building 22. This can be especially helpful in the event that the system monitor 50b is installed after the fact, either as a new, add-on component or as a replacement for an existing system monitor that is defective or malfunctioning. Since the vent pipe 14 can be of a standard size, e.g., 4-inch schedule 40 PVC pipe, the rear surface 204 of the base 200 that engages the vent pipe can be contoured to match the cylindrical surfaces of the pipe, thereby improving the fit.

In operation, the system monitor 50b monitors air flow in the vent pipe 14 and alarms when air flow in the pipe falls below a predetermined threshold, such as 10 cfm, in a manner substantially identical to that described above in reference to the system of FIG. 2. The system monitor 50*b* is configured to be installed in a vertically extending portion of the vent pipe 14 and positioned so that the vane pivots about the axis 224 in a generally vertical plane. Gravity acting on the vane 240 urges the vane to pivot downward as viewed in FIG. 11. Air flow, indicated generally by arrow D in FIG. 11, urges the vane 240 to pivot upward as viewed in FIG. 11.

In operation, air flow D in the vent pipe 14 causes the vane 240 to pivot upward against gravity. In an upward position of the vane illustrated in dashed lines at 240' in FIG. 11, the magnet 70*b* is positioned away from the magnetic sensor 64*b*. As air flow D is reduced, the vane 240 begins to pivot downward. Still, in these intermediate positions of the vane 240, the magnet 70*b* is positioned such that the magnitude of the magnetic flux acting on the magnetic sensor 64*b* is not sufficient to actuate the sensor. When the air flow D in the vent pipe 14 is reduced to a threshold level, the vane 240 reaches a corresponding pivotal position, illustrated in solid lines in FIG. 11. At this position of the vane 240, the magnet 70*b* is positioned so that the magnitude of the magnetic flux acting on the magnetic sensor 64*b* is sufficient to actuate the sensor. The circuit 54*b* is configured so that actuation of the magnetic sensor 64*b* activates the alarm 58*b*, indicating the low air flow condition of the radon mitigation system 20.

According to the invention, the wing 270 of the embodiment illustrated in FIGS. 7-13 is configured to provide a relatively large surface area against which the air flow in the vent pipe 14 acts. This large surface area improves the ability of the air flow switch 220 to respond to low air flow environments, such as those in the vent pipes of the radon mitigation systems. The large surface area and lightweight material construction of the wing 270, in combination with the careful balancing/counterbalancing of the pivot piece 242, allows the vane 240 to be configured to respond to relatively low air flow rates in the vent pipe 14.

The volumetric flow rate of the air in the vent pipe 14 is not the sole factor that needs to be taken into account when calculating the force with which the air urges the vane 240 to pivot. This force is more appropriately characterized as depending on the velocity and density of the air striking the wing 270. Since the density of the air in the vent pipe 14 is essentially constant, the force is primarily dependent on air velocity. Changes in air density due to elevation can, however, be taken into account.

For a standard vent pipe 14 having about a 4-inch inside diameter, 10 cfm air flow equates to an air velocity in the pipe of about 1.30 mph, which is a relatively low velocity. Due to this, the careful design and selection of the surface area of the wing 270 and the balance between the wing side 274 and magnet side 264 is important to ensure that the system monitor 50*b* is responsive to 10 cfm of air flow. Advantageously, by carefully configuring selecting an appropriate balance and wing configuration, the vane 240 can be configured to detect when air flow in the vent pipe 14 falls to or below 10 cfm. In fact, using these same principles, the vane 240 could be configured to detect higher or lower air flow rates. The vane 240 can be configured to detect air flow rates corresponding to higher air velocities in the vent pipe 14, such as 2.0 mph or more; and the vane can be configured to detect air flow rates corresponding to lower air velocities in the vent pipe, such as 1.0 mph or less.

Additionally, since it is the velocity of the air in the vent pipe 14 that is the primary determinative factor in the force placed on the wing 270, and since the air velocity for given volumetric flow rate depends on the cross-sectional area of the vent pipe 14, those skilled in the art will appreciate that a given vane design will respond differently to the same volumetric air flow rate in vent pipes 14 having different sizes. Advantageously, the vane 240 of the radon mitigation system monitor 50*b* includes features that help take this possibility into account. The system monitor 50*b* is designed to monitor the operation of a conventional radon mitigation system, and a preponderance of those systems utilize either a 4-inch or 3-inch (primarily 4-inch) vent pipe 14. Therefore, by adapting the system monitor 50*b* to be responsive to 10 cfm air flow in either of those standard pipe sizes, the monitor can be implemented in a preponderance of radon mitigation systems.

Figures 8, 12:
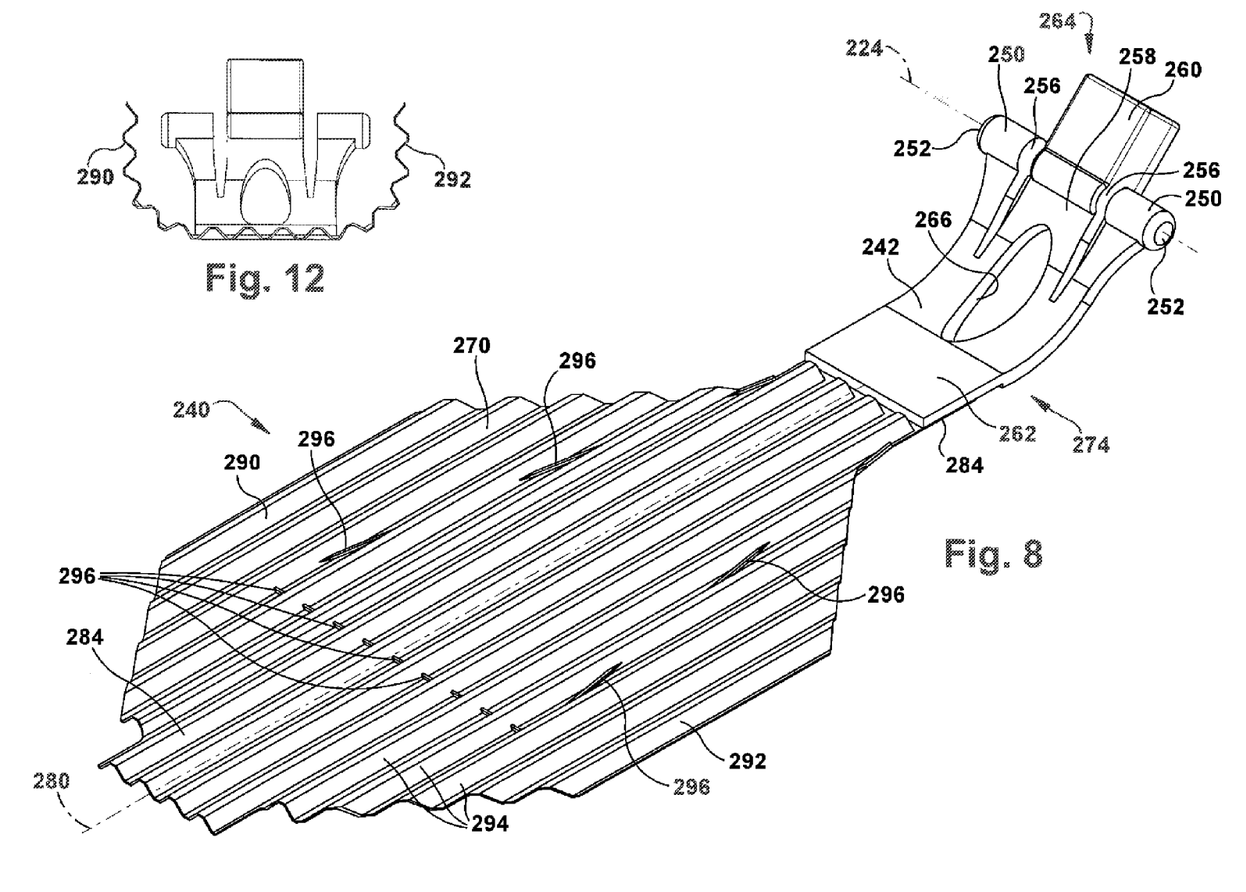
Figure 9:
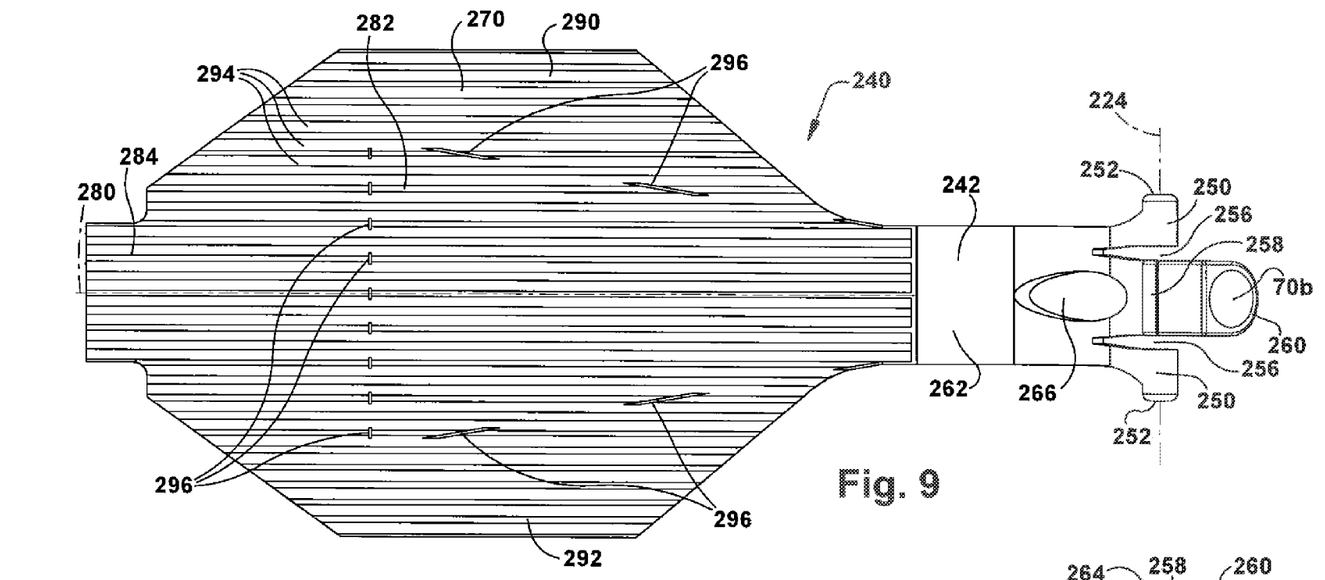
Figure 10:
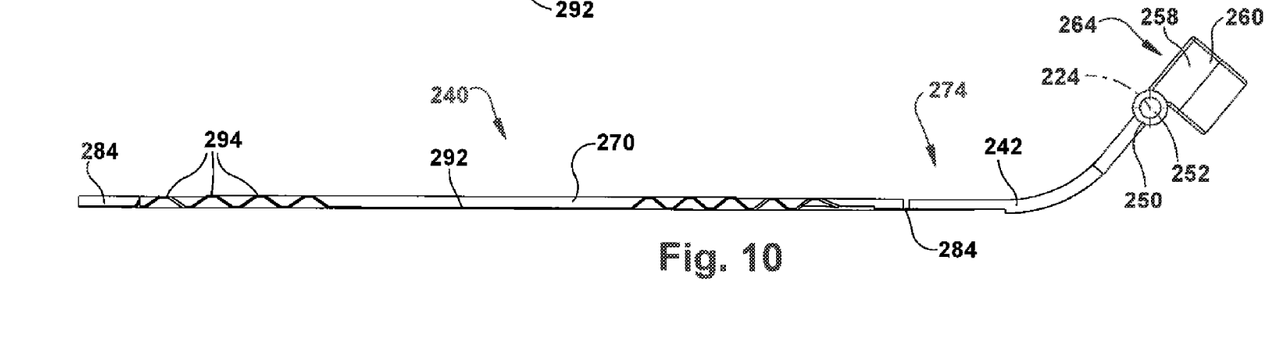
Figure 13:
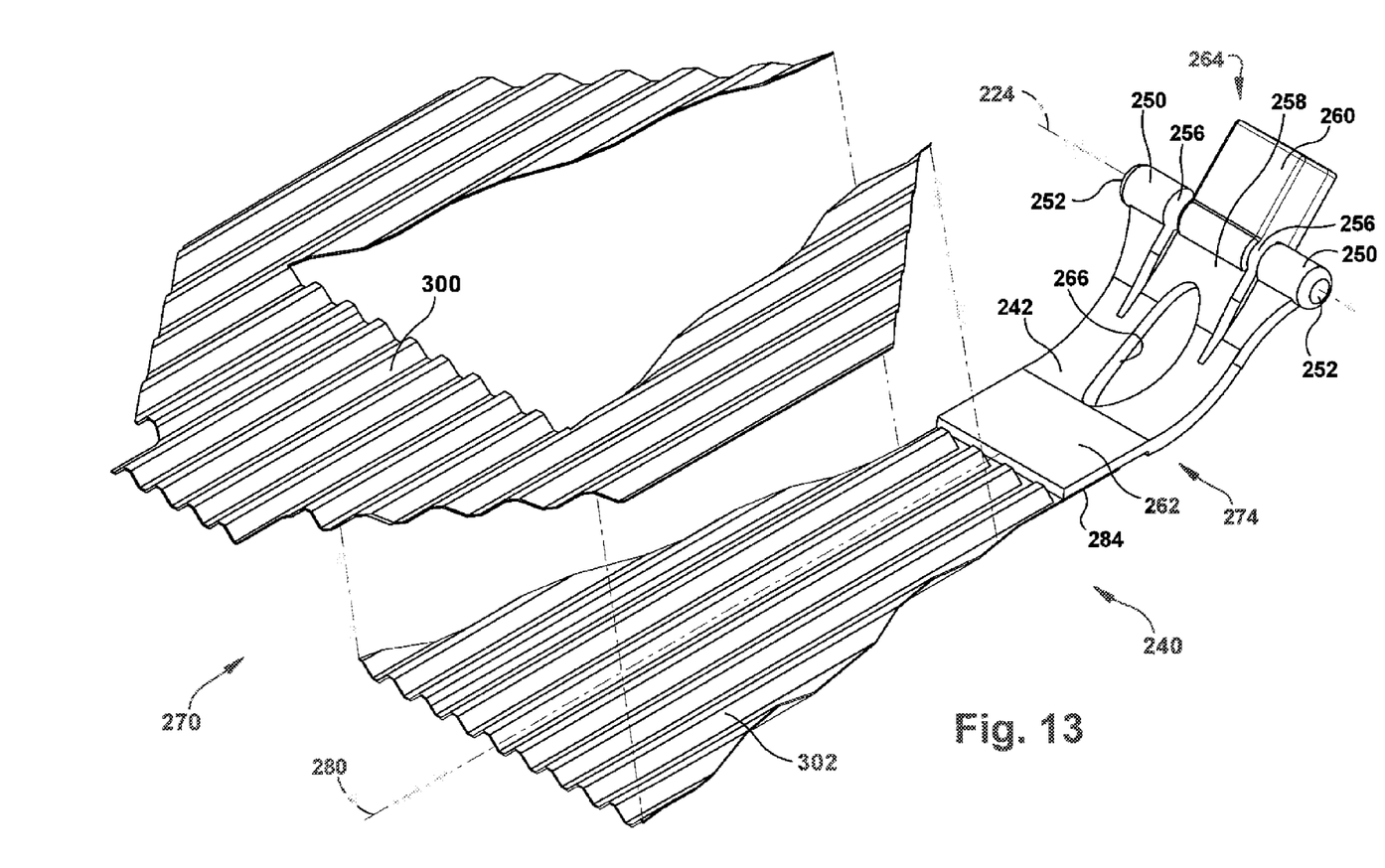

Referring to FIGS. 8, 9, and 13, according to the invention, the wing 270 can be configured to facilitate removal wing material so that the vane 240 can be selectively modified or re-configured to detect a threshold volumetric air flow magnitude in differently sized vent pipes 14. For example, the wing 270 can be configured to detect 10 cfm air flow in a 4-inch vent pipe, and also configured to facilitate removal of wing material to re-configure the vane 240 to detect 10 cfm air flow in a 3-inch vent pipe. To achieve this, the wing 270 can include features 296 for facilitating removal of wing material in an amount, shape, and location designed to re-configure the wing to respond to an increased air velocity that corresponds to the threshold volumetric air flow due to the smaller sized vent pipe.

For example, the wing material removal features 296 can comprise deformations, such as indentations or perforations, that serve as a template for removing wing material with ease and accuracy, thus reducing the surface area of the wing and thereby converting it from a 4-inch version to a 3-inch version. In this instance, to remove the wing material, the wing 270 could be cut with a tool, such as a knife or scissors, along the deformations 296 to reduce its size, with the deformations serving as a cutting guide and also providing tactile feedback indicating a proper cut as the cutting proceeds.

As another example, the wing material removal features 296 can comprise indicia, such as printed markings or etchings, etc., that serve as a guide for cutting the wing 270 with a tool, such as a knife or scissors, to reduce its size. In this example, the indicia 296 would outline the periphery of the smaller sized wing, thus providing a pattern to follow with the cutting tool. As a further alternative, the wing material removal features 296 can comprise a combination of perforations and indicia.

To re-configure the wing 270 for use in the smaller size vent tube 14, the wing is cut along the wing material removal features 296. This allows a portion 300 (see FIG. 13) of the wing material to be removed, leaving a portion remaining and forming the re-configured wing 302. The re-configured wing 302 has a reduced surface area and re-configured shape and dimensions selected so that the vane 240 can be responsive to the threshold volumetric air flow in the smaller sized vent pipe.

Advantageously, even though the wing 270 has a large surface area, it is also configured for installation in an existing vent pipe 14 through a nominally sized hole, such as a 0.75 inch hole, bored through the sidewall of the pipe. This is due to the material construction and corrugated configuration of the wing 270. The wing 270 is constructed of a resilient plastic/polymer material that, when deflected, will return to its original form once deflecting forces are relieved.

The corrugations 294 of the wing 270 extend lengthwise, parallel to the axis 280. The corrugations 294 provide lengthwise stiffness to the wing 270, i.e., the wing resists bending along lines transverse to the corrugations 294, but can be bent along lines parallel to the corrugations 294. The vane 240 is configured so that installation in the vent pipe 14 is achieved though lengthwise insertion of the wing 270 into the hole 218. Referring to FIG. 12, the corrugations 294 are configured to permit the wing extensions 290, 292 to be manipulated and bent manually in lateral directions (i.e., along bend lines that extend parallel to the corrugations 294) in order to curl the wing 270 to a shape/diameter that will fit through the hole 218 in the wall 20 of the vent pipe 14.

Advantageously, the configuration of the wing 270 permits the wing to have a width that is substantially greater than the diameter of the hole 218. For example, the width of the wing 270 can be greater than the diameter of the hole 218 by a factor of up to two or more. This allows the wing 270 to be configured with the large surface area necessary to respond to the relatively low flow rates in the vent pipe 14.

Once the wing 270 clears the hole 218, the wing extensions will return to their original configuration under their own resilience. The vane 240 is thus positioned in the interior 80 of the vent pipe 14. The base 200 can then be connected to the vent pipe 14, thus securing the system monitor 50b to the pipe. With batteries installed and the radon mitigation system 10 in operation, the system monitor 50b monitors air flow in the vent pipe 14 and will sound an alarm if that flow drops below a predetermined threshold indicative of a malfunction in the radon mitigation system.

While example embodiments have been presented in the foregoing detailed description, it should be appreciated that variations of these embodiments can exist without departing from the spirit and scope of the invention. The embodiments described herein are not intended to limit the scope, applicability, or configuration of the invention. Rather, the detailed description provides sufficient detail to enable one skilled in the art to make and use the invention. Those skilled in the art will perceive applications, improvements, changes and modifications to the invention. Such applications, improvements, changes and modifications within the skill of the art are intended to be covered by the appended claims.

We claim:

1. An apparatus for monitoring air flow in a vent pipe of a radon mitigation system, comprising:
   a base connectable to the vent pipe, the base housing a circuit that is actuatable to indicate the condition of the radon mitigation system; and
   an air flow switch for actuating the circuit, the air flow switch comprising a vane that is supported by the base and extends into the interior of the vent pipe through an opening in a wall of the vent pipe, the vane comprising a wing including portions that are deflectable to permit installation of the wing through an opening in the vent pipe, the deflectable portions returning under their own resilience to their non-deflected conditions once they pass through the opening in the vent pipe.

2. The apparatus recited in claim 1, wherein the deflectable portions of the wing comprise lateral extensions that are deflectable to permit insertion of the wing portion through the opening in the vent pipe, the lateral extensions returning to their non-deflected conditions under their own resilience.

3. The apparatus recited in claim 1, wherein the wing has a length measured along a longitudinal axis of the wing, and a width measured transverse to the length, the wing being configured to be installed lengthwise through the opening in the vent pipe, deflection of the wing for installation reducing the overall width of the wing.

4. The apparatus recited in claim 3, wherein the width of the wing is at least twice the diameter of the opening in the vent pipe.

5. The apparatus recited in claim 1, wherein the wing comprises corrugations that extend lengthwise along the length of the wing.

6. The apparatus recited in claim 5, wherein the corrugations are arranged adjacent to each other across the width of the wing.

7. The apparatus recited in claim 5, wherein the corrugations permit the deflectable portions to deflect along the corrugations about bend lines that extend parallel to the length of the corrugations.

8. The apparatus recited in claim 1, wherein the circuit comprises a magnetic sensor for actuating the circuit, and the vane comprises a magnet that is movable relative to the magnetic sensor when the vane pivots in response to air flow in the vent pipe.

9. The apparatus recited in claim 8, wherein the magnetic sensor comprises one of a reed switch and a Hall effect sensor.

10. The apparatus recited in claim 1, wherein the vane pivots relative to the base about a pivot axis, and wherein the base is installed on the vent pipe so that the vane pivots along a generally vertical plane, gravity acting on the vane to urge it to pivot toward an actuated condition of the air flow switch, air flow in the vent pipe acting on the wing urging the vane to pivot toward a non-actuated condition of the air flow switch.

11. The apparatus recited in claim 1, wherein the vane comprises a magnet side and a wing side positioned on opposite sides of a pivot axis so as to counterbalance each other with the moment of force due to gravity on the wing side of the vane being greater than the moment of force due to gravity on the magnet side so that gravity urges the vane to pivot toward the actuated condition, the counterbalance being selected so that air flow of a predetermined magnitude overcomes this counterbalance and causes the vane to pivot toward the non-actuated condition.

12. The apparatus recited in claim 11, wherein the predetermined air flow magnitude is 10 cfm.

13. The apparatus recited in claim 11, wherein the vent pipe is a standard vent pipe having an inside diameter of about 4-inches, the predetermined air flow magnitude being about 10 cfm.

14. The apparatus recited in claim 13, wherein the air flow switch is configured so that the vane pivots in a vertically extending plane against the force of gravity in response to the air flow.

15. The apparatus recited in claim 1, wherein the vane comprises a pivot piece to which the wing is connected, the pivot piece being connectable to the base and pivotable with respect to the base to allow the vane to pivot in response to air flow in the vent pipe acting on the wing.

16. The apparatus recited in claim 15, wherein the pivot piece comprises a magnet mount and a wing mount positioned on opposite sides of the pivot axis, the vane being configured so the moment of force due to gravity on the wing side of the vane is greater than the moment of force due to gravity on the magnet side of the vane which causes the vane to pivot toward the actuated condition, the counterbalance being selected so that air flow of a predetermined magnitude acting on the wing overcomes this counterbalance and causes the vane to pivot toward the non-actuated condition.

17. The apparatus recited in claim 16, wherein the vent pipe is a standard vent pipe having an inside diameter of about 4-inches, the predetermined air flow magnitude being about 10 cfm.

18. The apparatus recited in claim 17, wherein the air flow switch is configured so that the vane pivots in a vertically extending plane, against the force of gravity, in response to the air flow.

19. The apparatus recited in claim 1, wherein the deflection of the wing permits the wing to have a width that is larger than the diameter of the opening in the vent pipe by a factor of two or more.

20. The apparatus recited in claim 1, wherein the wing is shaped and dimensioned to actuate the switch in response to a predetermined volumetric air flow rate in a first vent pipe having a first cross-sectional area, the wing comprising wing material removal features for facilitating the removal of wing material to re-configure the wing to be responsive to the predetermined volumetric air flow rate in a second vent pipe having a second, smaller cross-sectional area.

21. The apparatus recited in claim 20, wherein the first vent pipe comprises a 4-inch vent pipe, and the second vent pipe comprises a 3-inch vent pipe.

22. The apparatus recited in claim 21, wherein the predetermined volumetric air flow rate is about 10 cfm.

23. The apparatus recited in claim 20, wherein the wing material removal features comprise at least one of deformations of the wing material and indicia on the wing material.

24. An apparatus for monitoring air flow in a vent pipe of a radon mitigation system, comprising:
   a base connectable to the vent pipe, the base housing a circuit that is actuatable to indicate the condition of the radon mitigation system; and
   an air flow switch for actuating the circuit, the air flow switch comprising a vane including a wing for being positioned in the vent pipe, wherein the wing is shaped and dimensioned to actuate the switch in response to a predetermined volumetric air flow rate in the vent pipe where the vent pipe has a first cross-sectional area, the wing comprising wing material removal features for facilitating the removal of wing material to re-configure the wing to be responsive to the predetermined volumetric air flow rate where the vent pipe has a second, smaller cross-sectional area.

25. The apparatus recited in claim 24, wherein the vent pipe having the first cross-sectional area comprises a 4-inch vent pipe, and the vent pipe having the second cross-sectional area comprises a 3-inch vent pipe.

26. The apparatus recited in claim 25, wherein the predetermined volumetric air flow rate is about 10 cfm.

27. The apparatus recited in claim 24, wherein the wing material removal features comprise at least one of deformations of the wing material and indicia on the wing material.

* * * * *